US006576305B2

(12) United States Patent
Williams, Jr. et al.

(10) Patent No.: US 6,576,305 B2
(45) Date of Patent: *Jun. 10, 2003

(54) PACKAGE HAVING A MULTILAYER FILM DISPOSED AROUND A LAYERED COIL OF FILAMENT STRANDS

(75) Inventors: Allen C. Williams, Jr., Spartanburg, SC (US); Jerry Lee Barton, Grand Prairie, TX (US); Archie Cameron, Wichita Falls, TX (US); Otto G. Jones, Wichita Falls, TX (US)

(73) Assignee: Saint-Gobain Vetrotex America, Inc., Wichita Falls, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/374,960

(22) Filed: Aug. 16, 1999

(65) Prior Publication Data
US 2001/0036521 A1 Nov. 1, 2001

Related U.S. Application Data

(63) Continuation of application No. 08/659,954, filed on Jul. 22, 1996, now abandoned.

(51) Int. Cl.[7] ............................ B32B 1/08; B65H 55/02
(52) U.S. Cl. .................... 428/34.9; 428/34.5; 428/36.3; 428/222; 206/388; 206/389; 206/409; 242/160.4; 242/170; 242/172
(58) Field of Search ................ 428/34.5, 34.9, 428/36.3, 222, 906; 206/388, 389, 409; 242/159, 160.4, 170, 172

(56) References Cited

U.S. PATENT DOCUMENTS

| 2,334,961 A | 11/1943 | Schoenlaub ................ 106/50 |
| 3,264,272 A | 8/1966 | Rees ........................ 260/78.5 |

(List continued on next page.)

FOREIGN PATENT DOCUMENTS

| FR | 1435073 | 3/1965 |
| WO | WO 90/03414 | 4/1990 |
| WO | WO 93/03093 | 2/1993 |

OTHER PUBLICATIONS

Journal of Polymer Science, vol. 20, pp. 441–455, Wild et al., "Determination of Branching Distributions in Polyethylene and Ethylene Copolymers".
Annual Book of ASTM Standards, D2732, pp. 368–371, Standard Test Method for Unrestrained Linear Thermal Shrinkage of Plastic Film and Sheeting.

*Primary Examiner*—Harold Pyon
*Assistant Examiner*—Sow-Fun Hon
(74) *Attorney, Agent, or Firm*—Duane Morris LLP

(57) ABSTRACT

A package comprises a layered coil of filament strands, and a multilayer film surrounding, and in direct contact with, the layered coil of filament strands. The coil has an outer surface comprising a bottom surface region, a side surface region, and a top surface region. The film has an inside surface comprising ionomer in direct contact with the side surface region of the layered coil of filaments. The strand material preferably comprises glass fiber and the sleeve preferably comprises a multilayer film having an outer layer comprising ionomer. Preferably, the film has a stiffness sufficient to maintain structural integrity of the package as the strands are being removed in order to prevent collapse of the side walls of the package and entanglement of the strands.

21 Claims, 4 Drawing Sheets

U.S. PATENT DOCUMENTS

| | | | |
|---|---|---|---|
| 3,382,971 A | 5/1968 | Johnson | 206/46 |
| 3,552,090 A | 1/1971 | Roberts et al. | 53/71 |
| 3,915,301 A * | 10/1975 | Gray et al. | 206/409 |
| 4,302,565 A | 11/1981 | Goeke et al. | 526/88 |
| 4,302,566 A | 11/1981 | Karol et al. | 526/125 |
| 4,348,439 A * | 9/1982 | Jones | 428/36 |
| 4,460,086 A | 7/1984 | Davis | 206/389 |
| 4,467,916 A * | 8/1984 | Hedden et al. | 206/410 |
| 4,525,414 A * | 6/1985 | Ohya et al. | 428/213 |
| 4,855,183 A * | 8/1989 | Oberle | 428/345 |
| 5,063,005 A * | 11/1991 | Doheny, Jr. | 264/22 |
| 5,206,075 A | 4/1993 | Hodgson, Jr. | 428/216 |
| 5,236,642 A * | 8/1993 | Blemberg et al. | 264/40.7 |
| 5,241,031 A | 8/1993 | Mehta | 526/348.1 |
| 5,272,236 A | 12/1993 | Lai et al. | 526/348.5 |
| 5,278,272 A | 1/1994 | Lai et al. | 526/348.5 |
| 5,382,470 A * | 1/1995 | Vicik | 428/334 |
| 5,846,620 A * | 12/1998 | Compton | 428/35.7 |

\* cited by examiner

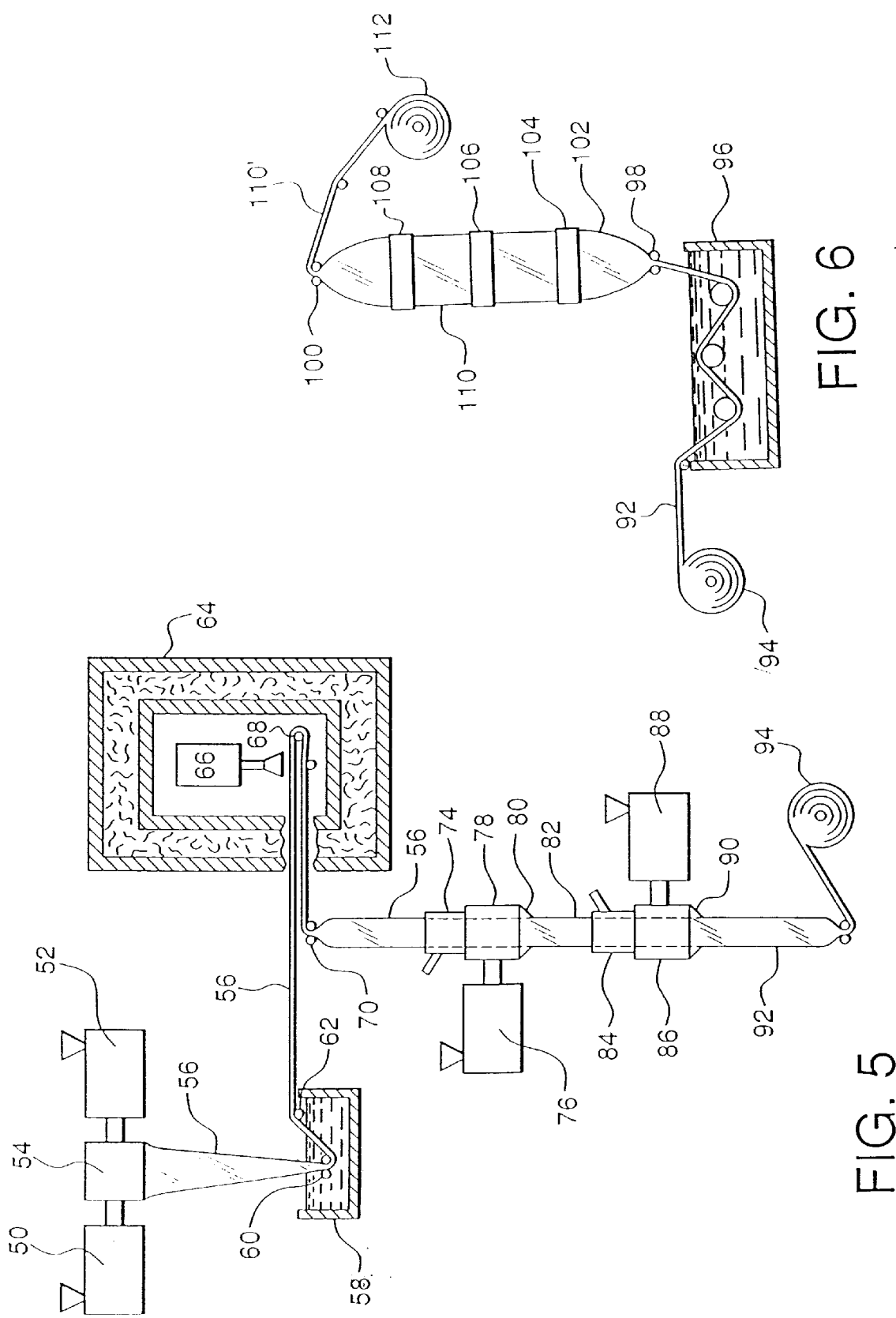

PACKAGE HAVING A MULTILAYER FILM DISPOSED AROUND A LAYERED COIL OF FILAMENT STRANDS

RELATED APPLICATIONS

This application is a continuation of application Ser. No. 08/659,954, filed on Jul. 22, 1996, now abandoned.

FIELD OF THE INVENTION

The present invention relates to a package having a multilayer film disposed around a layered coil of filament strands. More particularly, the present invention relates to a package having a multilayer film comprising an ionomer, disposed around a layered coil of filament strands such that the ionomer contacts the layered coil of filament strands.

BACKGROUND OF THE INVENTION

Packages having a layered coil of filament strands, in the form of a pirn, are removed from a package by the uncoiling of the layered filament strands from the inside of the pirn, until all of the strand material has been removed from the package. Such packaged pirns of, for example, glass fiber strands, are used in the manufacture of reinforced pipe, reinforced storage tanks, insulating jackets, glass fiber sheet, insulation for wiring, etc.

A problem in the removal of the layered filament strands from a pirn of strand material in a package is that as more of the strand material is removed from the inside of the pirn to the outside of the pirn, the outer layers of strands can become unsupported and collapse, causing the remaining portion of the strand to become tangled. This can interrupt production processes and cause waste of the entangled strand material. Several approaches to solving this problem are known.

One approach has been the application of adhesive materials to the interior of a package surrounding the sides of the pirn, so that the adhesive secures the outer strand layer to the package, thereby preventing the strand material from falling inwardly and becoming entangled. Yet another approach is to allow an outer sheet or film surrounding the strands to controllably collapse. Still another approach is to use a film around the strands that can be induced to undergo a high degree of shrinkage, thereby causing an intimate physical relationship between the outer strands and the sheet material, which provides support for the outer strands.

Another approach includes the use of a relatively thick sheet of an ionic copolymer, also referred to herein as an "ionomer", disposed around a wound strand. As the strand is removed from the wound strand, the uncoiling of the strand causes a wiping of the strand along the package, which in turn induces an electrostatic charge between the ionomer sheet and the strand coils that are in contact with the ionomer sheet. The induced charge forms an attraction between the strand and sheet, which is sufficiently strong to hold strands against the sheet and prevent their collapse, in spite of the weight of the coiled strand. However, this type of packaging has heretofore been expensive because a relatively large amount of ionomer resin is required to make the relatively thick ionomer sheet. Furthermore, the packaging of a pirn of wound strand material is cumbersome because a shrunken bag is generally used to hold the ionomer sheet against the outer surface of the pirn, adding to the complexity of the packaging. A need remains for methods of packaging pirns of strand material, having acceptable cost and minimizing waste by avoiding tangling and loss of the strand material.

A need also remains for new and/or improved packages for strand material. The present invention is directed to these, as well as other, important ends.

SUMMARY OF THE INVENTION

One aspect of the invention is a package comprising a layered coil of filament strands and a multilayer film disposed around the layered coil of filament strands. The coil has an outer surface comprising a bottom surface region, a side surface region and a top surface region. The multilayer film comprises a first outer layer forming an inside layer of the multilayer film, the first outer layer comprising ionomer resin, a second outer layer forming an outside layer of the multilayer film, the second outer layer comprising at least one member selected from the group consisting of ethylene/vinyl acetate copolymer, polyvinylidene chloride, polyethylene homopolymer, polypropylene homopolymer, ethylene/alpha-olefin copolymer, polyvinyl chloride, polyamide, polyester, and polystyrene, and at least one inner layer, at least one of the at least one inner layer being a bulk layer and comprising cross-linked ethylene/vinyl acetate copolymer with a thickness of at least about 0.5 mils. The first outer layer comprising ionomer resin is in direct contact with the side surface region of the layered coil of filaments. The multilayer film is in the form of a sleeve and the sleeve has a volume of from about 2.0× to 1.01× of a total volume of the coil of filament strands before shrinkage.

Another aspect of the invention is a package comprising a layered coil of filament and a sleeve surrounding, and in direct contact with, the layered coil of filament strands. The layered coil has an outer surface comprising a bottom surface region, a side surface region, and a top surface region. The sleeve comprises a multilayer film, wherein the multilayer film comprises:

(a) a first outer layer forming an inside layer of the package, comprising ionomer in an amount of from about 50 to 100 weight percent, based on the weight of the first outside layer, said first outer layer having a thickness of from at least about 0.05 mils;

(b) a second outer layer forming an outside layer of the package, comprising a blend of 50 to 99 weight percent ethylene/vinyl acetate copolymer and 1 to 50 weight percent olefin polymer, based on the weight of the second outer layer, said second outer layer having a thickness of at least about 0.01 mils;

(c) a first inner layer which is between the first outer layer and the second outer layer, the first inner layer comprising ethylene/vinyl acetate copolymer in an amount of from about 50 to 100 weight percent, based on the weight of the first inner layer, the first inner layer having a thickness of at least about 0.5 mils;

(d) a second inner layer which is between the first inner layer and the second outer layer, the second inner layer comprising, in an amount of at least about 50 weight percent based on the weight of the second inner layer, at least one member selected from the group consisting of ethylene/vinyl alcohol copolymer and polyvinylidene chloride, the second inner layer having a thickness of at least about 0.05 mils; and (e) a third inner layer which is between the second inner layer and the second outer layer, the third inner layer comprising ethylene/vinyl acetate copolymer in an amount of from about 50 to 100 weight percent, based on the weight of the third inner layer, the third inner layer having a thickness of at least about 0.5 mils.

Another aspect of the invention is a package comprising a layered coil of filament strands and a sleeve surrounding, and in direct contact with, the layered coil of filament strands. The coil has an outer surface comprising a bottom surface region, a side surface region, and a top surface region. The sleeve comprises a multilayer film, wherein the multilayer film comprises:

(a) a first outer layer forming an inside layer of the package, comprising ionomer in an amount of from about 50 to 100 weight percent, based on the weight of the first outside layer, said first outer layer having a thickness of at least about 0.05 mils;

(b) a second outer layer forming an outside layer of the package, comprising a blend of 50 to 99 weight percent ethylene/vinyl acetate copolymer and 1 to 50 weight percent olefin polymer, based on the weight of the second outer layer, said second outer layer having a thickness of at least about 0.01 mils;

(c) a first inner layer which is between the first outer layer and the second outer layer, the first inner layer comprising ethylene/vinyl acetate copolymer in an amount of from about 50 to 100 weight percent, based on the weight of the first inner layer, the first inner layer having a thickness of at least about 0.5 mils;

(d) a second inner layer which is between the first inner layer and the second outer layer, the second inner layer comprising ethylene/vinyl acetate copolymer in an amount of from about 50 to 100 weight percent, based on the weight of the second inner layer, the second inner layer having a thickness of at least about 0.5 mils.

Brief Description of the Drawings

FIG. 5 is schematic view of a first stage of a process for making a preferred film useful in the preparation of a package according to the present invention.

FIG. 6 is a schematic view of a second stage of a process for making a preferred film useful in the preparation of a package according to the present invention.

Detailed Description of the Invention

Figure 1:
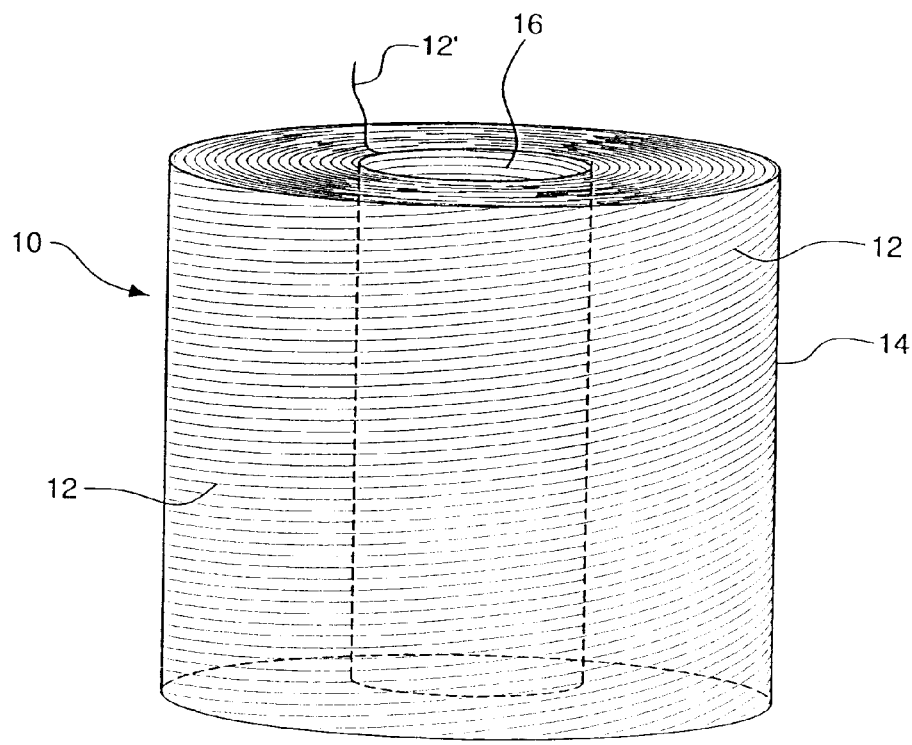
FIG. 1 is a perspective view of a package according to the present invention.

As used herein, the word "coil" refers generally to a winding of a filamentary strand or strands. As used herein, the phrase "layered coil" refers generally to a wound strand or strands having both vertical strand layers and horizontal strand layers, e.g., having a configuration such as that of a line on a fishing reel spool.

As used herein, the term "sleeve" is inclusive of seamed tubular structures, as well as seamless tubular structures, regardless of whether or not the tubular structure is closed at one end and open at the other end, or open at both ends. As used herein, the term "bag" refers to a sleeve that is closed at one end, and includes end-seal bags, side-seal bags, pouches, etc. suitable for holding a coil.

As used herein, the term "monomer" refers to a relatively simple molecule, usually containing carbon and of low molecular weight, which can react to form a polymer by combination with itself or with other similar molecules.

As used herein, the term "comonomer" refers to a monomer which is copolymerized with at least one different monomer in a copolymerization reaction, the result of which is a copolymer.

As used herein, the term "polymer" refers to a macromolecule formed by the chemical union of five or more monomers, and is inclusive of homopolymers, copolymers, terpolymers, etc.

As used herein, the term "homopolymer" refers to a polymer resulting from the polymerization of a single repeated monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "copolymerization" refers to the simultaneous polymerization of two or more different monomers.

As used herein, terminology employing a "/" with respect to the chemical identity of a copolymer (e.g., "an ethylene/alpha-olefin copolymer"), identifies the comonomers which are copolymerized to produce the copolymer. This terminology, as used herein, refers to the primary comonomer first, followed by the secondary comonomer. The copolymerization is preferably carried out in the presence of more (on a weight percent basis) of the primary comonomer than the secondary comonomer.

As used herein, the phrase "heterogeneous polymer" refers to polymerization reaction products having relatively wide variation in molecular weight and relatively wide variation in composition distribution, i.e., polymers made, for example, using conventional Ziegler-Natta catalysts. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

As used herein, the term "polyolefin" refers to any polymerized olefin, which can be linear, branched, cyclic, aliphatic, aromatic, substituted, or unsubstituted. Examples of polyolefins include polyethylene, polypropylene, polybutenes, polyisoprene, and copolymers thereof.

As used herein, the term "film" is used in a generic sense to include plastic web, regardless of whether it is film or sheet. Preferably, films of and used in the present invention have a thickness of 25 mil or less. As used herein, the term "package" refers to packaging materials used in the packaging of a product.

As used herein, the phrases "inner layer" and "internal layer" refer to any layer of a multilayer film having its two principal surfaces with other layers of the multilayer film.

As used herein, the phrase "outer layer" refers to any layer of a multilayer film having only one of its principal surfaces directly adhered to another layer of the film.

As used herein, the phrase "directly adhered", as applied to film layers, refers to adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and the object layer. As used herein, the phrase "direct contact" refers to the relationship between two objects that are directly touching one another, i.e., without any other object therebetween.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus.

As used herein, the phrase "sealant layer", with respect to multilayer films, refers to an outer film layer which is involved in the sealing of the film to itself or another layer. Although the phrase "sealant layer" as herein used refers only to outer film layers, no matter how thin, it should also be recognized that in general, the outer 0.5 mil to 1.0 mil of a film is involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the term "lamination", and the phrase "laminated film", refer to the process, and resulting product, made by bonding together two or more layers of film or other materials. Lamination can be accomplished by joining layers with adhesives, joining with heat and pressure, and even spread coating and extrusion coating. Multilayer films can be made via coextrusion and/or lamination.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards,* Vol. 08.02, pp. 368–371, which is hereby incorporated, in its entirety, by reference thereto. "Total free shrink" is determined by summing the percent free shrink in the machine direction with the percentage of free shrink in the transverse direction. For example, a film which exhibits 50% free shrink in the transverse direction (using ASTM D 2732) and 60% free shrink in the machine direction (again, using ASTM D 2732), has a "total free shrink" of 110%.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

The packages of the present invention can replace thicker and more costly sheets of resin material used in prior packages for coils and pirns of filamentary materials. The packages of the present invention utilize a multilayer film having ionomer resin present on at least one surface thereof. The multilayer film is disposed around a coiled strand and is in direct contact with the coiled strand. In this manner, the package of the present invention eliminates the need to use the relatively complex combination of a shrinkable bag together with a separate ionomer film. The packages of the present invention include an ionomer layer that is considerably thinner than the sheets comprising ionomers that are used in previous packages, and allow all of a strand material contained therein to be removed without the collapse of either the strand material or the package.

The packages of the present invention include a layered coil of filament strands and a film surrounding, and in direct contact with, the layered coil of filament strands. The coil has an outer surface comprising a bottom surface region, a side surface region, and a top surface region. The film has an inside surface comprising an ionomer, the ionomer being in direct contact with a side surface region of the layered coil of filaments.

Preferably, the film comprises at least one member selected from the group consisting of polypropylene, polyethylene, polyamide, polyester, polyvinyl chloride, and ethylene/vinyl acetate copolymer. More preferably, the film is a multilayer film having a first layer, which is an outer layer, comprising an ionomer, and a second layer comprising at least one member selected from the group consisting of ethylene/vinyl acetate copolymer, vinylidene chloride, polyethylene homopolymer, polypropylene homopolymer, and ethylene/alpha-olefin copolymer, polyvinyl chloride, polyamide, polyester, and polystyrene. Even more preferably, the multilayer film has at least three layers, including an inner layer comprising at least one member selected from the group consisting of ethylene/vinyl acetate copolymer, vinylidene chloride, polyethylene homopolymer, polypropylene homopolymer, and ethylene/alpha-olefin copolymer, polyvinyl chloride, polyamide, polyester, and polystyrene. Ethylene/alpha-olefin copolymers are preferably homogeneous copolymers.

Homogeneous ethylene/alpha-olefin copolymers may be characterized by one or more methods known to those of skill in the art, such as molecular weight distribution (Mw/Mn), composition distribution breadth index (CDBI), and narrow melting point range and single melt point behavior. The molecular weight distribution (Mw/Mn), also known as polydispersity, may be determined by gel permeation chromatography. The homogeneous ethylene/alpha-olefin copolymers useful in this invention will have a (Mw/Mn), of less than 2.7. Preferably, the ($M_w/M_n$) will have a range of about 1.9 to 2.5. More preferably, the (Mw/Mn), will have a range of about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p. 441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point (T.), as determined by Differential Scanning Colorimetry (DSC), of from about 60° C. to 110° C. Preferably, the homogeneous copolymer has a DSC peak $T_m$ of from about 90° C. to 110° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 110° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ a-monoolefin, more preferably, a $C_4$–$C_{12}$ a-monoolefin, more preferably, a $C_4$–$C_8$ α-monoolefin. Still more preferably, the alpha-olefin comprises at least one member selected from the group consisting of butene-1, hexene-1, and octene-1, i.e., 1-butene, 1-hexene, and 1-octene, respectively. Yet still most preferably, the alpha-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one species of homogeneous ethylene/alpha-olefin copolymers is disclosed in U.S. Pat. No. 5,206,075, to HODGSON, Jr., U.S. Pat. No. 5,241,031, to MEHTA, PCT International Publication Number WO 93/03093, in the name of Exxon Chemical Company, PCT International Publication Number WO 90/03414, in the name of Exxon Chemical Patents, Inc., all four of which are hereby incorporated in their entireties, by reference there. Still another species of homogeneous ethylene/alpha-olefin copolymers, generally referred to as long-chain-branched homogeneous ethylene/alpha-olefin copolymers, is disclosed in U.S. Pat. No. 5,272,236, to LAI, et. al., and U.S. Pat. No. 5,278,272, to LAI, et. al., both of which are hereby incorporated in their entireties, by reference thereto.

In highly preferred embodiments, the package comprises a multilayer film comprising: (a) a first outer layer comprising an ionomer in an amount of at least about 50 to 100 weight percent, based on the weight of the first layer, the first layer having a thickness of from about 0.05 to 1 mil; (b) a second outer layer comprising a blend of from about 50 to 99 weight percent, of ethylene vinyl acetate copolymer, based on the weight of the second outer layer and from about 1 to about 50 weight percent linear low density polyethylene, based on the weight of the layer, the outside layer having a thickness of from about 0.02 to 2 mils, (c) a first inner layer which is between the first outer layer and the second outer layer, the first inner layer comprising from about 50 weight percent to about 100 weight percent ethylene/vinyl acetate copolymer, based on the weight of the first inner layer, the first inner layer having a thickness of from about 0.5 to 5 mils, (d) a second inner layer which is between the first inner layer and the second outer layer, the second inner layer comprising from about 50 to 100 weight percent, based on the weight of the second inner layer, of at least one member selected from the group consisting of ethylene/vinyl alcohol copolymer and polyvinylidene chloride, the second inner layer having a thickness of from about 0.05 to 0.5 mils; and (e) a third inner layer which is between second inner layer and the second outer layer, the third inner layer comprising from about 50 to 100 weight percent ethylene/vinyl acetate copolymer, based on the weight of the third inner layer, the third inner layer having a thickness of from about 0.5 to 2 mils.

The film may be in the form of a sleeve, and is disposed around a coil of filament strands. The sleeve may be open at both ends, or closed at one end and open at the opposite end, i.e., may be in the form of a bag. Preferably, the sleeve is in the form of a bag, and can be sealed at one end of the coil (an "end-seal bag") or sealed with a seam in the longitudinal direction of the coil (a "side-seal bag"). An end-seal bag provides the advantage of no bag seam in contact with the outer side surface of the coiled strand material. A side-seal bag provides the advantage of better control of bag width than for end-seal bags.

When a sleeve is formed from a film of the invention, the sleeve has an inside surface and an outside surface. When the sleeve is used in a package for a coil of filament strands, the inside surface is adjacent to the coil and the outside surface is disposed away from the coil. The inside surface of the sleeve corresponds to the first outer layer of the film. The outside surface of the sleeve corresponds to the second outer layer of the film.

Preferably, when used in a package of the present invention having an initial conformation, the film has a rigidity sufficient to maintain the initial package conformation after removal of the filament strand. Preferably, the film of the package has a thickness of up to about 25 mils, more preferably, from about 0.5 to 25 mils, still more preferably, from about 1 to 10 mils, yet still more preferably, from about 2 to 5 mils.

Preferably, the film is heat shrinkable. The shrinkability of the film can be described using the degree of "total free shrink" of the film. Preferably, the film has a total free shrink at 185° F. of at least about 20 percent, such as, for example, about 25 percent, before the shrinking step is carried out. More preferably, the film before shrinking has a total free shrink of from about 20 to 150 percent, still more preferably, from about 50 to 120 percent, and yet still more preferably from about 70 to 110 percent.

Preferably, a sleeve formed from a film according to the present invention and used in a package containing a coil of filament strands has a volume of from about 2.0× to 1.01× the volume of the coil of filament strands before shrinking of the film. More preferably, the sleeve has a volume of from about 1.8× to 1.05× the total volume of the coil of filament strands before shrinking of the film. Still more preferably, the sleeve has a volume of from about 1.7× to 1.1× the total volume of the coil of filament strands.

The shrinkability of the films used in the packages of the present invention provides tight fit around a coil or pirn contained therein. A tight fit can be achieved using a conventional hot air shrink system. The high shrink of the sleeve results in a thickening of the multilayer film from which the sleeve is made, to result in a more abuse-resistant package which can possess a stiffness to allow the end user of the packaged product to dispense the fiber from the center of the pirn without any collapsing of the pirn once the fiber reaches the last few wraps on the pirn. The ionomer resin in the inside surface of the multilayer film from which the sleeve is made creates a static charge between the fiber and the inside surface of the sleeve, thereby aiding in the stability of the outer wraps as the pirn is being dispensed at the end user. In combination with the stiffness of the sleeve, the static charge obtained through the use of the ionomer resin insures smooth, trouble free feeding of the outer glass fiber wraps by the end user of the package. Furthermore, the high free shrink of the multilayer film from which the sleeve is made allows the end user of the package to realize additional efficiency by being able to package a wider variety of pirn diameters with only one sleeve size.

A layered coil of filament strands can be packaged according to the processes of the invention. A process for packaging a layered coil of filament strands comprises (a) inserting the layered coil of filament strands into a sleeve formed from a heat shrinkable multilayer film, the coil having an outer surface comprising a bottom surface region, a side surface region, and a top surface region; and (b) shrinking the sleeve tightly around the layered coil of filament strands. The sleeve has an inside surface comprising ionomer, and the ionomer is in direct contact with the side surface region of the layered coil of filament strands.

Although the layered coil of filament strands may be on a spindle, preferably the layered coil of filament strands has a hollow core.

The layered coil may be a strand, yarn or roving and may comprise any one or more of various materials. Preferably, the filament strands comprise at least one member selected from the group consisting of glass fiber, polyester, polyamide, cotton, hemp, linen, carbon, and metal. More preferably, the filament strands comprise glass fiber; still more preferably, alkaline-free glass fiber. Preferably, the strand comprises multi-filament glass material, such as an alkaline-free glass known in the trade as "E" glass. Suitable strand materials that have been found to be desirable for the practice of the present invention include 100 percent "E" glass (e.g., made in accordance with U.S. Pat. No. 2,334,961, hereby incorporated, in its entirety, by reference thereto), 100 percent "R" (or high-strength) glass (e.g., made in accordance with French Patent No. 1,435,073, also hereby incorporated, in its entirety, by reference thereto), 100 percent polyester, 100 percent nylon, 100 percent cotton, and mixtures of nylon and other materials, such as metal, hemp, and linen. Preferably, the filament strands comprise continuous glass filaments in at least one yarn bundle having a diameter of from about 0.002 inch to 4 inches, more preferably, 0.005 to 0.5 inch, and still more preferably, 0.008 to 0.125 inch. Also, in accordance with the present invention, various sizes or sizings, such as are conventionally applied to glass roving filaments upon their formation, may be utilized.

The packages and processes of the invention provide a process for supplying a strand material from a hollow pirn. The hollow pirn comprises a layered coil of filament strands. The coil has an outer side surface region and an inside surface region. The process comprises continuously withdrawing the strand material from the inside surface of the layered coil of filament strands, while the outer side surface region of the layered coil of filament strands is in direct contact with a sleeve comprising an inside surface comprising ionomer, and the ionomer is in direct contact with the outside surface of the layered coil of filaments. Preferably, the removal of the strand material continues until the entirety of the strand material is removed from the package, without entanglement of the strands. Also preferably, the removal of the strand material is accomplished without collapse of the sleeve.

The coil of filamentary strands can have any desired transverse cross-sectional shape, i.e., any desired cross-sectional shape transverse to an axis the coils are coiled around. For example, the transverse cross-sectional shape can be round, oval, rectangular, or square. Furthermore, the longitudinal cross-sectional shape, i.e., the cross-sectional shape along the axis of the coil, can be any desired shape, e.g., rectangular, square, oval, or even round. The layered coil of filament strands in the package of the present invention has a bottom surface region, a side surface region, and a top surface region. For coils having rectangular and square longitudinal cross-sectional shapes, the bottom, side, and top surface regions are readily apparent. However, for a coil having a round or rounded longitudinal cross-sectional shape, the that portion of the surface of the coil which is deemed to be the "bottom surface region" of the coil is not as easily defined. In such circumstances, as used herein, the "bottom surface region" of such a coil having a round or rounded longitudinal cross-sectional shape is herein defined to be that portion of the surface of the coil which corresponds with the lower ⅓ of the length of the vertically-oriented axis of the coil; the "side surface region" of such a coil is herein defined to be that portion of the surface of the coil which corresponds with the middle ⅓ of the length of the vertically-oriented axis of the coil; and, the "top surface region" of such a coil is herein defined to be that portion of the surface of the coil which corresponds with the upper ⅓ of the length of the vertically-oriented axis of the coil. Preferably, the coil has a generally circular transverse cross-sectional shape and a generally rectangular longitudinal cross-sectional shape, and a substantially flat bottom surface and a substantially planar top surface.

The production and winding of various strand materials for the formation of pirns, especially pirns of glass fiber strand material, is disclosed in U.S. Pat. No. 4,348,439, entitled "PACKAGE OF WOUND STRAND MATERIAL", to Otto G. Jones, hereby incorporated, in its entirety, by reference thereto.

The strand material can be wound into a generally tubular package of coiled fibers, with many individual fibers (or filaments) making up the strand, and with the various coils being superimposed over other coils. Preferably, a strand very tightly wound onto a paper sleeve carried by a mandrel, with the mandrel preferably being collapsible to facilitate removal of the package of strand 13 therefrom. The purpose of winding the strand is to form a generally self-supporting package.

The invention is now described according to the accompanying drawings. FIG. 1 illustrates a perspective view of package 10 according to the present invention. Package 10 has coiled yarn 12 forming a pirn having generally cylindrical outer surface 14. Coiled yarn 12 is unwound (for subsequent use) as uncoiled yarn 12'. Package 10 is hollow, having an air filled core inward of inside cylindrical surface of the pirn. Uncoiled yarn 12' is removed from the inside cylindrical surface surrounding air filled core 16. Coiled yarn 12 is surrounded by shrunken bag 18, which is in direct contact with outer surface 14. Shrunken bag 18 preferably is shrunken tightly against outer surface 14, and is in intimate contact with outer surface 14.

Figure 2:
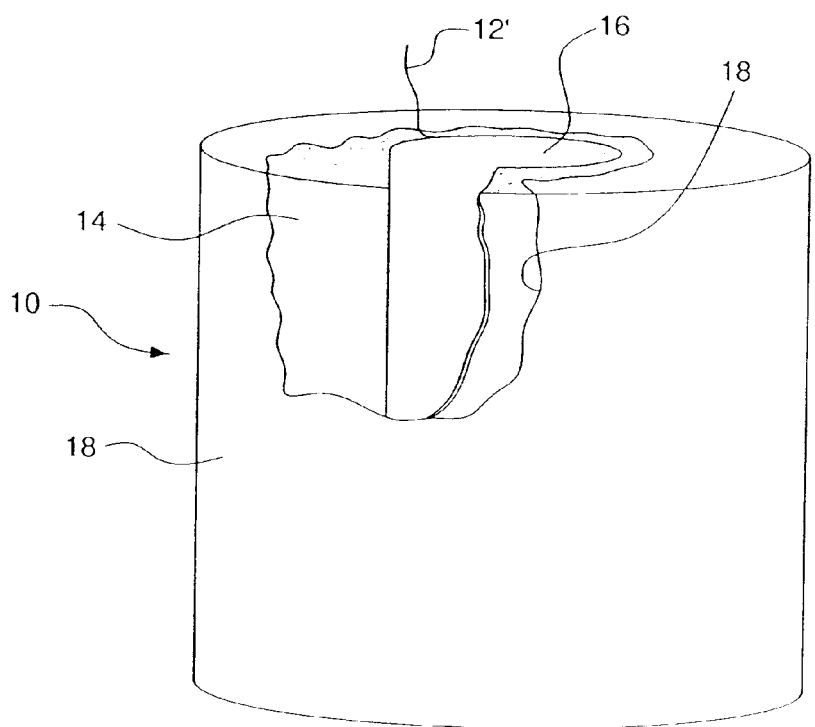
FIG. 2 is a cutaway perspective view of the package illustrated in FIG. 1.

FIG. 2 illustrates a perspective cut-away view of package 10 illustrated in FIG. 1. FIG. 2 illustrates the relationship between shrunken bag 18 and outer surface 14, as illustrates hollow air-filled core 16 surrounded by coiled yarn 12.

Figure 3:
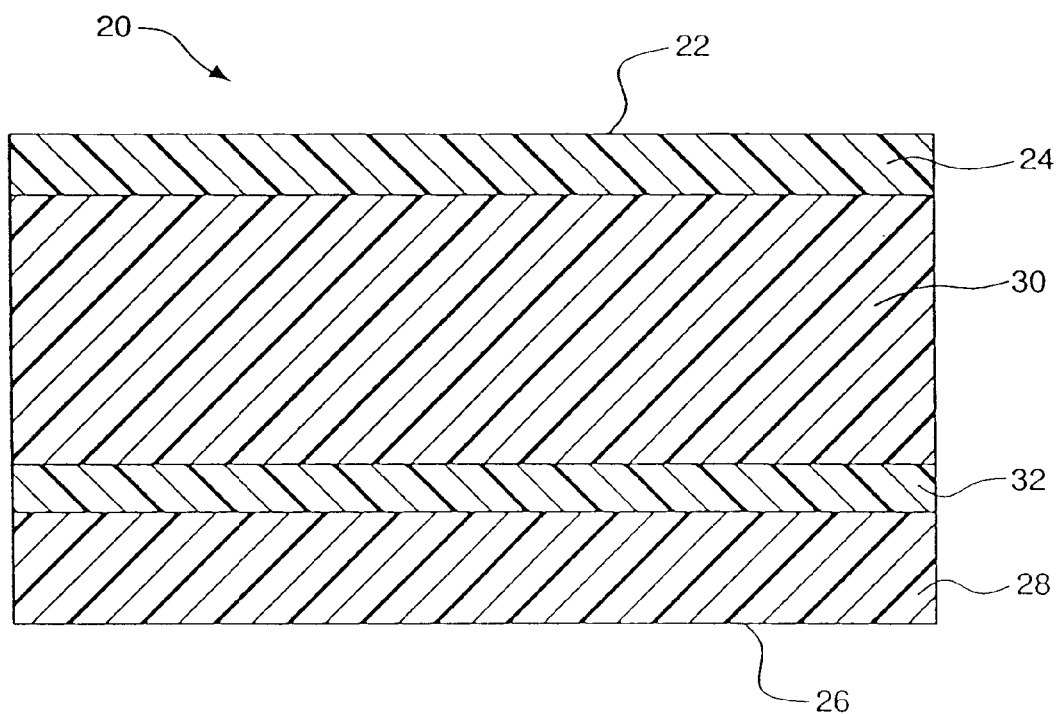
FIG. 3 is an enlarged cross-sectional view of a preferred multilayer film for use in the package of the present invention.
Figure 4:
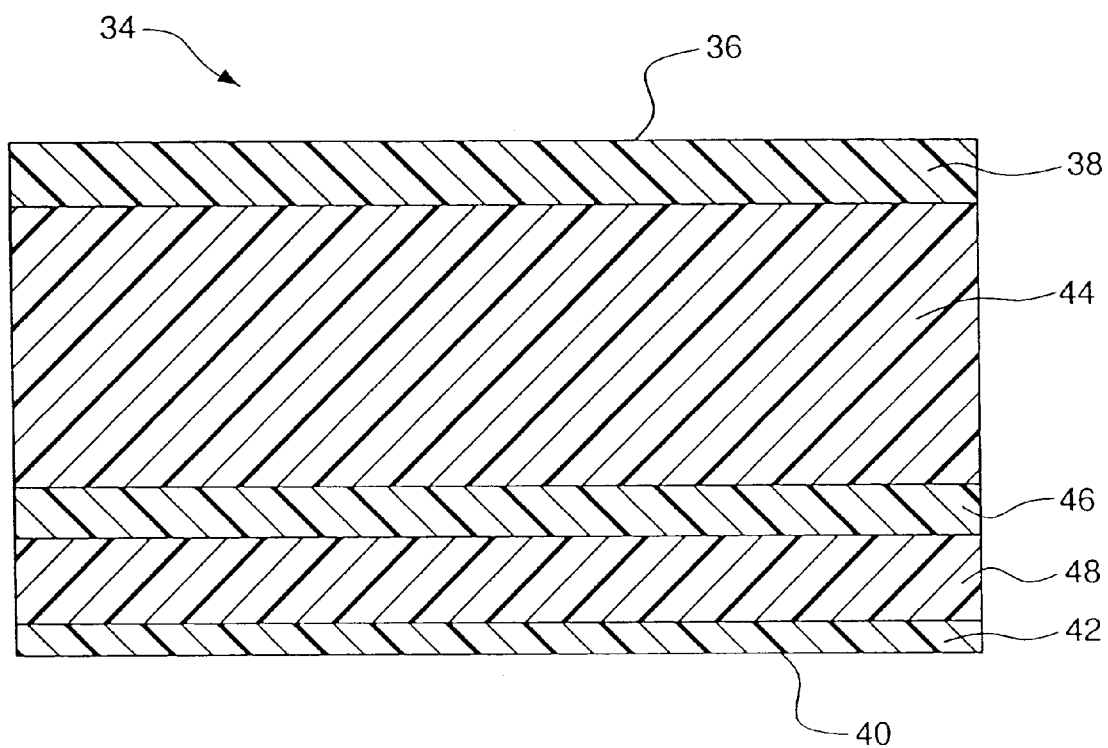
FIG. 4 is an enlarged cross-sectional view of another preferred multilayer film for use in the package according to the present Invention.

FIG. 3 illustrates an enlarged cross-sectional view of a preferred heat-shrinkable, biaxially oriented film 20 of film tubing 110' produced by a process illustrated in FIGS. 5 and 6, this process being discussed in detail below. Film outer surface 22 represents the inside layer of film tubing 110', and comprises ionomer resin. Preferably, outer film layer 24 comprises ionomer, preferably 100% ionomer, based on the weight of layer 24. Film outer surface 26 represents the outside surface of film tubing 110'. Film outer layer 28 represents the outside layer of film tubing 110', and can comprise any one or more of a wide variety of polymeric compositions. Preferred polymers include ethylene vinyl acetate copolymer, vinylidene chloride, polyethylene, polypropylene, polyvinyl chloride, polyamide, polyester, and polystyrene. More preferably, outer layer 28 comprises a blend of high density polyethylene and ethylene/vinyl acetate copolymer. First inner film layer 30 is a bulk layer which preferably comprises crosslinked ethylene/vinyl acetate copolymer. Second inner layer 32 comprises vinylidene chloride copolymer. The four-ply film illustrated in the enlarged cross-sectional view of FIG. 3 has low gas and moisture permeability, excellent abuse-resistance and structural strength, heat-shrinkability and self-weldability, FIG. 4 illustrates an enlarged cross-sectional view of a more preferred, heat-shrinkable, biaxially-oriented film 34 of film tubing 110' also produced by the process illustrated in FIGS. 5 and 6, discussed in detail below. Film 34 first outer surface 36 represents the inside layer of film tubing 110', and comprises ionomer resin. Preferably, first outer layer 38 comprises ionomer, preferably 100% ionomer, based on the weight of layer 38. Second outer surface 40 represents the outside surface of film tubing 110'. Film second outer layer 42 represents the outside layer of film tubing 110', and can comprise any one or more of a wide variety of polymeric compositions. Preferred polymers include ethylene vinyl acetate copolymer, vinylidene chloride, polyethylene, polypropylene, polyvinyl chloride, polyamide, polyester, and polystyrene. More preferably, second outer layer 42 comprises a blend of high density polyethylene and ethylene/vinyl acetate copolymer. First inner film layer 44 is a bulk layer which preferably comprises crosslinked ethylene/vinyl acetate copolymer. Second inner layer 46 preferably comprises vinylidene chloride copolymer. Third inner layer 48 is a second bulk layer which preferably has the same composition as first inner layer 44. The five-ply film illustrated in the enlarged cross-sectional view of FIG. 4 has low gas-permeability and low moisture-permeability, excellent abuse-resistance and structural strength, heat-shrinkability and self-weldability.

FIG. 5 illustrates a schematic of a preferred process which is a first stage in the making of a film useful in the preparation of the package of the present invention. Conventional extruders 50 and 52 feed coextrusion die 54 to produce multilayer tubular substrate tape 56. For purposes of this schematic, only two extruders are illustrated. Although not illustrated, a suitable release agent, such as corn starch, is applied to, or otherwise present on, the inside surface of tubular substrate tape 56, to prevent the inside surface of the tape from self-welding upon the tubing being cooled by bath 58 and collapsed by nip rolls 60. Thereafter, tubular substrate tape 56 leaves bath 58 via roller 62. Tubular substrate tape 56 is then forwarded into shielded irradiation vault 64, through a beam emitted by electron accelerator 66, passes over roller 68, and then out of vault 64 and through nip rolls 70. The electron beam produced by accelerator 66 imparts a dosage of from 2.5 to 2.5 N4-R to tubular substrate tape 56. Immediately after passing through nip rolls 70, tubular substrate tape 56 is inflated (but not transversely stretched). Inflated tubular substrate tape 56 is then forwarded through vacuum chamber 74 and through coating die 78 (which is fed by extruder 76), wherein tubular substrate tape 56 receives a first coating layer or layers. Vacuum chamber 74 removes air from around inflated tubular substrate tape 56, in order to prevent air bubbles from being trapped between inflated tubular substrate tape 56 and coating layer 80.

After coating layer 80 is applied to inflated tubular substrate tape 56, the resulting once-extrusion-coated tubing 82 is forwarded through second extrusion coating die 86 (fed by extruder 88), wherein once-extrusion-coated tubing 82 receives second coating 90 thereon, thereby forming twice-extrusion-coated tubing 92. Vacuum chamber 84 removes air from around once-extrusion-coated tubing 82. Twice-extrusion-coated tubing 92 is wound to form roll 94.

FIG. 6 illustrates a second stage in the process of manufacturing of a film useful in the preparation of the package of the present invention. Twice-extrusion-coated tubing 92 is unwound from roll 94, and forwarded through hot water bath 96 having water therein which is maintained at approximately 170° F. (94° C.). As twice-extrusion-coated tubing 92 leaves water bath 96 and passes through lower nip rolls 98, twice-extrusion-coated tubing 92 is inflated with air, in the formation of trapped bubble 102, which is between lower nip rolls 98 and upper nip rolls 100. Air rings 104, 106, and 108 surround and deliver cool air to an exterior surface of bubble 102, in order to cool the resulting heat-shrinkable, biaxially-oriented film tubing 110 so that the inside surface of biaxially-oriented film tubing 110 does not self-weld at nip rolls 100. The chilled air from air rings 104, 106, and 108 impinges uniformly on the surface of bubble 102. Film tubing 110', in its flattened tubular configuration, is wound up to form wound film tubing 112. Wound film tubing 112 can be unwound and transversely sealed and severed to form bags which are heat-shrinkable and self-weldable, and which are suitable for the formation of the package in accordance with the present invention.

Preferred packaging films useful in the present invention are described in the examples set forth below. In each of the examples which follow, the heat-shrinkable film is produced in accordance with the process as schematically illustrated in FIGS. 5 and 6, and as described above.

EXAMPLE 1

A four-layer film as illustrated in FIG. 3 is produced by a process as schematically illustrated in FIGS. 5 and 6. First outer layer 24, which corresponds with the inside layer of film tubing 110', is 100 weight percent (based on weight of first outer layer 24) SURLYN® 1702-1 ionomer resin, obtained from E. I. DuPont de Nemours, of Wilmington, Del., this ionomer resin being disclosed in U.S. Pat. No. 3,264,272, dated Aug. 2, 1966, hereby incorporated, in its entirety, by reference thereto. First inner layer 30 is a bulk layer which comprises 100 weight percent (based on weight of first layer 30) EP 4062-2 ethylene/vinyl acetate copolymer having a vinyl acetate content of 15% (also obtained from DuPont). Second inner layer 32 is 100 weight percent (based on weight of layer 32) MA 134 vinylidene chloride/methyl acrylate copolymer (obtained from the Dow Chemical Company of Midland, Mich.). Second outer layer 28 is an abuse-resistant layer and is a blend of. (a) 92.5 weight percent LD-318.920 ethylene/vinyl acetate copolymer having a vinyl acetate mer content of 9%, a melt index of 2.0, and a density of 0.930, obtained from the Exxon Chemical Company, of Baytown, Tex.; and, (b) 7.5 weight percent DOWLEX® 2045.03 linear low density polyethylene having a density of 0.920, also obtained from the Dow Chemical Company. First outer layer 24 and the first inner layer 30 are coextruded in a first stage as illustrated in FIG. 5, and are subjected to an irradiation dosage of 3.5 megarads. After two separate extrusion coating steps, the resulting four-ply extrusion-coated tape is oriented out of a hot water bath having a temperature of about from about 185° F. to 190° F., i.e., in a manner as illustrated in FIG. 6, with the orientation being carried out in an amount of about 3× in the machine direction and 4× in the transverse direction.

The resulting heat-shrinkable, biaxially-oriented film 20 in the form of film tubing 110', has a lay-flat width of about 18½ inches, a transverse free shrink at 185° F. of about 55 to 59%, a machine direction free shrink at 185° F. of about 44 to 51%, and a total thickness of about 1.95 mils. Layer 24 has a thickness of 0.3 mil. Layer 30 has a thickness of about 1.0 mil. Layer 32 has a thickness of 0.2 mil. Layer 28 has a thickness of about 0.5 mil. Lay-flat film tubing 110' is converted into an end-seal bag on conventional bag making equipment, as known to those of skill in the art. The resulting end-seal bag has a lay-flat size of 18 inches by 18½ inches.

The resulting bags are applied to a tape in shingled configuration, in a manner disclosed in U.S. Pat. No. 3,552,090, to J. T. Roberts et al, issued Jan. 5, 1971, hereby incorporated in its entirety by reference thereto. A coreless pirn (i.e., having a hollow, air-filled core) of glass fiber strands, having a cylindrical shape, an outside diameter of 11 inches, and a height of 10 inches, is placed in the bottom of the bag, with the top of the bag being left open, i.e., unsealed. The bag, now having the pirn therein, is pulled free of the tapes. The bag and pirn therein are both then passed through a 325° F. hot-air shrink tunnel. The bag and pirn are in the tunnel for a period of about 4 seconds. During this time, the bag shrinks tightly around the pirn, leaving a hole at the top where the open end of the bag shrinks tightly against the top surface of the cylindrical pirn.

The resulting package is tested for unwinding properties. In this test, the glass fiber strand is unwound outwardly, i.e., from the center of the pirn outward. Unwinding is continued until the entire strand is removed from the bag. The bag maintains its conformation even as the last of the strand is removed from the bag, and the strand does not collapse or knot up even as the last of the strand is being removed from the bag.

EXAMPLE 2

A biaxially-oriented, heat-shrinkable film was prepared by a process in accordance with the schematics of FIGS. 5 and 6. The film had the cross-section of film 34 as illustrated in FIG. 4, described above. First outer layer 38, which corresponds with the inside surface of film tubing 110', was 100 weight percent (based on weight of first outer layer 38) SURLYN® 1702-1 ionomer resin, as identified and described in Example 1 above. First inner layer 44 served as a bulk layer and comprised 100 weight percent (based on weight of first layer 44) EP 4062-2 ethylene vinyl acetate copolymer, also as identified and described in Example 1 above. Second inner layer 46 was 100 weight percent (based on weight of layer 32) MA 134 vinylidene chloride methyl acrylate copolymer, also as identified and described in Example 1, above. Third inner layer 48 had the same composition as first inner layer 44. Second outer layer 42 served as an abuse-resistant layer and was a blend of. (a) 92.5 weight percent LD-318.92® ethylene/vinyl acetate copolymer having a vinyl acetate mer content of 9%, a melt index of 2.0, and a density of 0.930, obtained from the Exxon Chemical Company, of Baytown, Tex., and, (b) 7.5 weight percent DOWLEX® 2045.03 linear low density polyethylene having a density of 0.920, also obtained from the Dow Chemical Company. First outer layer 38 and first inner layer 44 were coextruded in a first stage as illustrated in FIG. 5, and were subjected to an irradiation dosage of 3.5 megarads. After two separate extrusion coating steps (the first extrusion coating steps adding two additional layers, and the second coextrusion step adding a the fifth layer), the resulting five-ply extrusion-coated tape was oriented out of a hot water bath having a temperature of from about 180° F. to 185° F., i.e., in a manner as illustrated in FIG. 6, with the orientation being carried out in an amount of about 3× in the machine direction and 4× in the transverse direction.

The resulting heat-shrinkable, biaxially-oriented film 34 in the form of film tubing 110, had a lay-flat width of about 18½ inches, a transverse free shrink at 185° F. of about 55 to 59%, a machine direction free shrink at 185° F. of about 44 to 51%, and a total thickness of about 1.95 mils. Layer 38 had a thickness of 0.3 mil. Layer 44 had a density of about 0.9, contained about 15% vinyl acetate, and had a thickness of about 1.0 mil. Layer 46 had a thickness of about 0.2 mil. Layer 48 had a thickness of about 0.4 mil. Layer 42 had a thickness of about 0.1 mil. Lay-flat film tubing 110' was converted into an end-seal bag on conventional bag making equipment, in an manner as is known to those of skill in the art. The resulting end-seal bag had a lay-flat size of 18½ inches by 18½ inches.

The resulting bags were applied to a tape in shingled configuration, as described in Example 1, above. A coreless pirn (i.e., having a hollow, air-filled core) of glass fiber strands, having a cylindrical shape, an outside diameter of 11 inches, and a height of 10 inches, was placed in the bottom of the bag, with the top of the bag left open, i.e., unsealed. The bag, now having the pirn therein, was pulled free of the two tapes adhering to it. The bag and pirn therein were both then passed through a 325° F. hot-air shrink tunnel. The bag and pirn were in the tunnel for a period of about 4 seconds. During this time, the bag shrunk tightly around the pirn, leaving a hole at the top where the open end of the bag shrunk tightly against the top surface of the cylindrical pirn.

The resulting package was tested for unwinding properties. In this test, the glass fiber strand was unwound outwardly, i.e., from the center of the pirn outward. Unwinding was continued until the entire strand was removed from the bag. The bag maintained its conformation even as the last of the strand was removed from the bag, and the strand did not collapse or knot up even as the last of the strand was being removed from the bag.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A package comprising:
   (a) a layered coil of filament strands, the coil having an outer surface comprising a bottom surface region, a side surface region, and a top surface region; and
   (b) a multilayer film disposed around the layered coil of filament strands, said multilayer film comprising a first outer layer forming an inside layer of the multilayer film comprising ionomer resin and a second outer layer forming an outside layer of the multilayer film comprising at least one member selected from the group consisting of ethylene/vinyl acetate copolymer, polyvinylidene chloride, polyethylene homopolymer, polypropylene homopolymer, ethylene/alpha-olefin copolymer, polyvinyl chloride, polyamide, polyester, and polystyrene, and at least one inner layer, at least one of said at least one inner layer being a bulk layer and comprising cross-linked ethylene/vinyl acetate copolymer with a thickness of at least about 0.5 mils; and
   wherein the first outer layer comprising ionomer resin is in direct contact with the side surface region of the layered coil of filaments, and
   wherein the multilayer film is in the form of a sleeve, and wherein the sleeve has a volume of from about 1.01× to 2.0× of a total volume of the coil of filament strands before shrinkage.

2. The package according to claim 1, wherein the sleeve is in the form of a bag.

3. The package according to claim 1, wherein the layered coil of filament strands is on a spindle.

4. The package according to claim 1, wherein the layered coil of filament strands has a hollow core.

5. The package according to claim 1, wherein the coil of filament strands has a generally circular transverse cross-sectional shape and a generally rectangular longitudinal cross-sectional shape, and a substantially flat bottom surface and a substantially planar top surface.

6. The package according to claim 5, wherein the coil of filament strands has a hollow core.

7. The package according to claim 1, wherein the filament strands comprise at least one member selected from the group consisting of glass fiber, polyester, polyamide, cotton, hemp, linen, carbon, and metal.

8. The package according to claim 1, wherein the filament strands comprise glass fiber.

9. The package according to claim 8, wherein the glass comprises alkaline-free glass.

10. The package according to claim 8, wherein the filament strands comprise continuous glass filaments in at least one yarn bundle having a diameter of from about 0.002 inch to 4 inches.

11. The package according to claim 1, wherein the film has a rigidity sufficient to maintain the original package conformation after removal of the filament strand.

12. The package according to claim 1, wherein the film has a thickness of from about 0.5 to 25 mils.

13. The package according to claim 1, wherein the film has a total free shrink at 185° of at least about 20 percent.

14. The package according to claim 1, wherein said multilayer film is a four-ply film which includes two inner layers being a first inner layer and a second inner layer, and wherein said first inner layer comprises cross-linked ethylene/vinyl acetate copolymer and is between said first outer layer and said second inner layer, and wherein said second inner layer comprises vinylidene chloride copolymer and is between said first inner layer and said second outer layer.

15. The package according to claim 14, wherein said second outer layer comprises a blend of high density polyethylene and ethylene/vinyl acetate copolymer.

16. The package according to claim 14, wherein said second outer layer comprises 92.5 weight percent ethylene/vinyl acetate copolymer and 7.5 weight percent low density polyethylene.

17. The package according to claim 14, wherein said first outer layer comprises about 100 weight percent ionomer resin based on the weight of said first outer layer, and wherein said first inner layer comprises about 100 weight percent cross-linked ethylene/vinyl acetate copolymer based on the weight of said first inner layer with a vinyl acetate content of about 15 percent, and wherein said second inner layer comprises about 100 weight percent vinylidene chloride/methyl acrylate copolymer based on the weight of said second inner layer.

18. The package according to claim 14 wherein said multilayer film has a total thickness of about 1.9 mils, and wherein said first outer layer has a thickness of about 0.3 mils, and wherein said first inner layer has a thickness of about 1.0 mils, and wherein said second inner layer has a thickness of about 0.2 mils, and wherein said second outer layer has a thickness of about 0.5 mils.

19. The package according to claim 1, wherein said multilayer film is a five-ply film, and wherein said film includes three inner layers being a first, second and third inner layer, and wherein said first inner layer comprises cross-linked ethylene/vinyl acetate copolymer, and wherein said second inner layer comprises at least one member selected from the group consisting of ethylene/vinyl acetate copolymer and polyvinylidene chloride, and wherein said third inner layer comprises ethylene/vinyl acetate copolymer.

20. The package according to claim 19, wherein said first inner layer is between said first outer layer and said second inner layer, and wherein said second inner layer is between said first inner layer and said third inner layer, and wherein said third inner layer is between said second inner layer and said second outer layer.

21. The package according to claim 1, wherein said multilayer film includes four or more inner layers, said four or more inner layers comprising at least one member selected from the group consisting of ethylene/vinyl acetate copolymer, vinylidene chloride, polyethylene homopolymer, polypropylene homopolymer, ethylene/alpha-olefin copolymer, polyvinyl chloride, polyamide, polyester, and polystyrene.

* * * * *

UNITED STATES PATENT AND TRADEMARK OFFICE
CERTIFICATE OF CORRECTION

PATENT NO. : 6,576,305 B2
DATED : June 10, 2003
INVENTOR(S) : Williams et al.

It is certified that error appears in the above-identified patent and that said Letters Patent is hereby corrected as shown below:

Title page,
Item [63], Related U.S. Application Data, change "Jul. 22, 1996" to -- June 7, 1996 --.

Signed and Sealed this

Seventh Day of September, 2004

JON W. DUDAS
*Director of the United States Patent and Trademark Office*